(12) United States Patent
Cho

(10) Patent No.: US 9,720,271 B2
(45) Date of Patent: Aug. 1, 2017

(54) DISPLAY APPARATUS

(71) Applicant: Samsung Display Co., LTD., Yongin-si, Gyeonggi-Do (KR)

(72) Inventor: Dong-beom Cho, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/955,649

(22) Filed: Dec. 1, 2015

(65) Prior Publication Data

US 2016/0202537 A1 Jul. 14, 2016

(30) Foreign Application Priority Data

Jan. 14, 2015 (KR) .................. 10-2015-0006712

(51) Int. Cl.
G02F 1/1333 (2006.01)
G02F 1/1335 (2006.01)
H05K 5/02 (2006.01)

(52) U.S. Cl.
CPC .. *G02F 1/133308* (2013.01); *G02F 1/133606* (2013.01); *H05K 5/02* (2013.01); *G02F 2001/133314* (2013.01)

(58) Field of Classification Search
CPC ......... G02F 1/133308; G02F 1/133606; G02F 2201/503; G02F 2201/465; G02F 2201/46; G02F 2001/133314; G02F 2001/133322; G02F 2202/28; H05K 5/02
USPC .................................. 220/686, 324; 349/58
See application file for complete search history.

(56) References Cited

U.S. PATENT DOCUMENTS

| | | | |
|---|---|---|---|
| 6,175,396 B1* | 1/2001 | Kim .................. | G02F 1/133308 349/58 |
| 7,118,265 B2* | 10/2006 | Cho .................. | G02F 1/133308 349/58 |
| 2005/0254236 A1* | 11/2005 | Fu ..................... | G02F 1/133608 362/186 |
| 2007/0047265 A1* | 3/2007 | Kang .................. | G02B 6/0086 362/634 |
| 2010/0141863 A1* | 6/2010 | Chang ............... | G02F 1/133308 349/58 |
| 2010/0165236 A1* | 7/2010 | Bae ...................... | G02B 6/0021 349/58 |
| 2011/0205464 A1* | 8/2011 | Kim .................. | G02F 1/133608 349/64 |

(Continued)

FOREIGN PATENT DOCUMENTS

| | | |
|---|---|---|
| JP | 2010230740 A | 10/2010 |
| KR | 1020050113479 A | 12/2005 |
| KR | 1020090046049 A | 5/2009 |

(Continued)

*Primary Examiner* — Adrian S Wilson
*Assistant Examiner* — Abhishek Rathod
(74) *Attorney, Agent, or Firm* — Cantor Colburn LLP

(57) ABSTRACT

A display apparatus includes a display panel which receives light to display an image, a backlight unit, which includes a light source providing the light to the display panel, and a support member supporting the display panel, at least one protrusion part disposed on a side surface of the display panel and protruding from the side surface of the display panel, and a coupling member disposed on the at least one protrusion part and coupled to the support member, where the display panel is fixed to the support member by the coupling member.

9 Claims, 12 Drawing Sheets

(56) References Cited

U.S. PATENT DOCUMENTS

2015/0002780 A1* 1/2015 Lu ................... G02F 1/133308
349/60

FOREIGN PATENT DOCUMENTS

| KR | 1020110094394 A | 8/2011 |
| KR | 1020120004648 A | 1/2012 |
| KR | 1020130005217 A | 1/2013 |
| KR | 1020130027204 A | 3/2013 |
| KR | 1020130110601 A | 10/2013 |
| KR | 1020140061061 A | 5/2014 |
| KR | 1020140072634 A | 6/2014 |

* cited by examiner

DISPLAY APPARATUS

This U.S. non-provisional patent application claims priority to Korean Patent Application No. 10-2015-0006712, filed on Jan. 14, 2015, and all the benefits accruing therefrom under 35 U.S.C. §119, the content of which in its entirety is hereby incorporated by reference.

BACKGROUND

1. Field

The invention herein relates to a display apparatus including a narrow bezel.

2. Description of the Related Art

Among display apparatuses, liquid crystal display apparatuses generally include a display panel including a plurality of pixels for generating an image, and a backlight unit for providing light to the display panel. The pixels of the display panel display the image by adjusting transmissivity of the light provided from the backlight unit.

Display apparatuses may include a top chassis for covering a non-display region of a display panel, and a bottom chassis for accommodating a backlight unit and other elements in order to couple the display panel to the backlight unit.

SUMMARY

A top chassis covers a bezel region as a non-display region of a display panel, and it is difficult to provide a narrow bezel to the display apparatuses.

The invention provides a display apparatus including a narrow bezel.

Embodiments of the invention provide display apparatuses including a display panel, a backlight unit, a protrusion part, and a coupling member. The display panel receives light to display an image. The backlight unit includes a light source providing the light to the display panel, and a support member supporting the display panel. The protrusion part is disposed on a side surface of the display panel and protrudes from the side surface of the display panel. The coupling member is disposed on the at least one protrusion part and is coupled to the support member. The display panel is fixed to the support member by the coupling member.

In an exemplary embodiment, the at least one protrusion part may protrude in a direction perpendicular to the side surface of the display panel.

In an exemplary embodiment, the display panel may include an upper substrate and a lower substrate, and the at least one protrusion part may protrude from the lower substrate and be unitary with the lower substrate.

In an exemplary embodiment, the at least one protrusion part may have a tetragonal shape in a plan view.

In an exemplary embodiment, a recess may be defined in a surface of the at least one protrusion part adjacent to the side surface of the display panel, and the coupling member may be disposed in the recess to couple the display panel to the support member.

In an exemplary embodiment, the recess may be defined in an upper surface of the at least one protrusion part.

In an exemplary embodiment, the recess may be defined in a side surface of the at least one protrusion part.

In an exemplary embodiment, the at least one protrusion part may have a width that increases in a direction away from the side surface of the display panel.

In an exemplary embodiment, the support member may include a bottom part on which the light source is placed, and a side wall part which supports the display panel, and the coupling member is coupled to the side wall part.

In an exemplary embodiment, the backlight unit may further include at an optical sheet and an accommodating member. The optical sheet may control the light to guide the light to the display panel. The accommodating member may accommodate the light source, the optical sheet, and the support member. The support member may support the display panel and the optical sheet.

In an exemplary embodiment, the coupling member may include a pressing part and a connecting part. The pressing part may be disposed on the at least one protrusion part to press the display panel to the support member. The connecting part may extend from the pressing part and be bent to the support member to be coupled to the support member. The coupling member may have elasticity.

In an exemplary embodiment, the coupling member may include a first coupling part, a second coupling part, and a third coupling part. The first coupling part may be disposed on the at least one protrusion part. The second coupling part may extend from an end of the first coupling part and be bent to the support member to be coupled to the support member. The third coupling part may extend from the other end of the first coupling part and be bent to the support member to be coupled to the support member.

In an exemplary embodiment, accommodating recesses may be defined in the support member to accommodate the second coupling part and the third coupling part.

In an exemplary embodiment, the support member may be unitary with the coupling member.

In an exemplary embodiment, the support member may include a protrusion protruding to the display panel and disposed on a surface supporting the display panel, and a recess may be defined in the at least one protrusion part to accommodate the protrusion.

In other embodiments of the invention, display apparatuses include a plurality of display panels, at least one support member, at least one protrusion part, and a coupling member. The plurality of display panels may display an image and be arrayed in the form of tiles. The at least one support member may support the plurality of display panels. The at least one protrusion part may be disposed on a side surface of each of the plurality of display panels and protrude from the side surface. The coupling member may be disposed on the at least one protrusion part and be coupled to the at least one support member. The plurality of display panels may be fixed to the at least one support member by the coupling member.

In an exemplary embodiment, the coupling member may include a pressing part and a connecting part. The pressing part may be disposed on the at least one protrusion part to press each of the plurality of display panels to the at least one support member. The connecting part may extend from the pressing part and be bent to the at least one support member to be coupled to the at least one support member. The coupling member may have elasticity.

In an exemplary embodiment, the coupling member may include a first coupling part, a second coupling part, and a third coupling part. The first coupling part may be disposed on the at least one protrusion part. The second coupling part may extend from an end of the first coupling part and be bent to the at least one support member to be coupled to the at least one support member. The third coupling part may extend from the other end of the first coupling part and be bent to the at least one support member to be coupled to the at least one support member.

In an exemplary embodiment, each of the plurality of display panels may include an upper substrate and a lower substrate, and the at least one protrusion part may protrude from the lower substrate and be unitary with the lower substrate.

BRIEF DESCRIPTION OF THE DRAWINGS

The above and other exemplary embodiments, advantages and features of this invention will become more apparent by describing in further detail exemplary embodiments thereof with reference to the accompanying drawings, in which.

DETAILED DESCRIPTION

Figure 1:
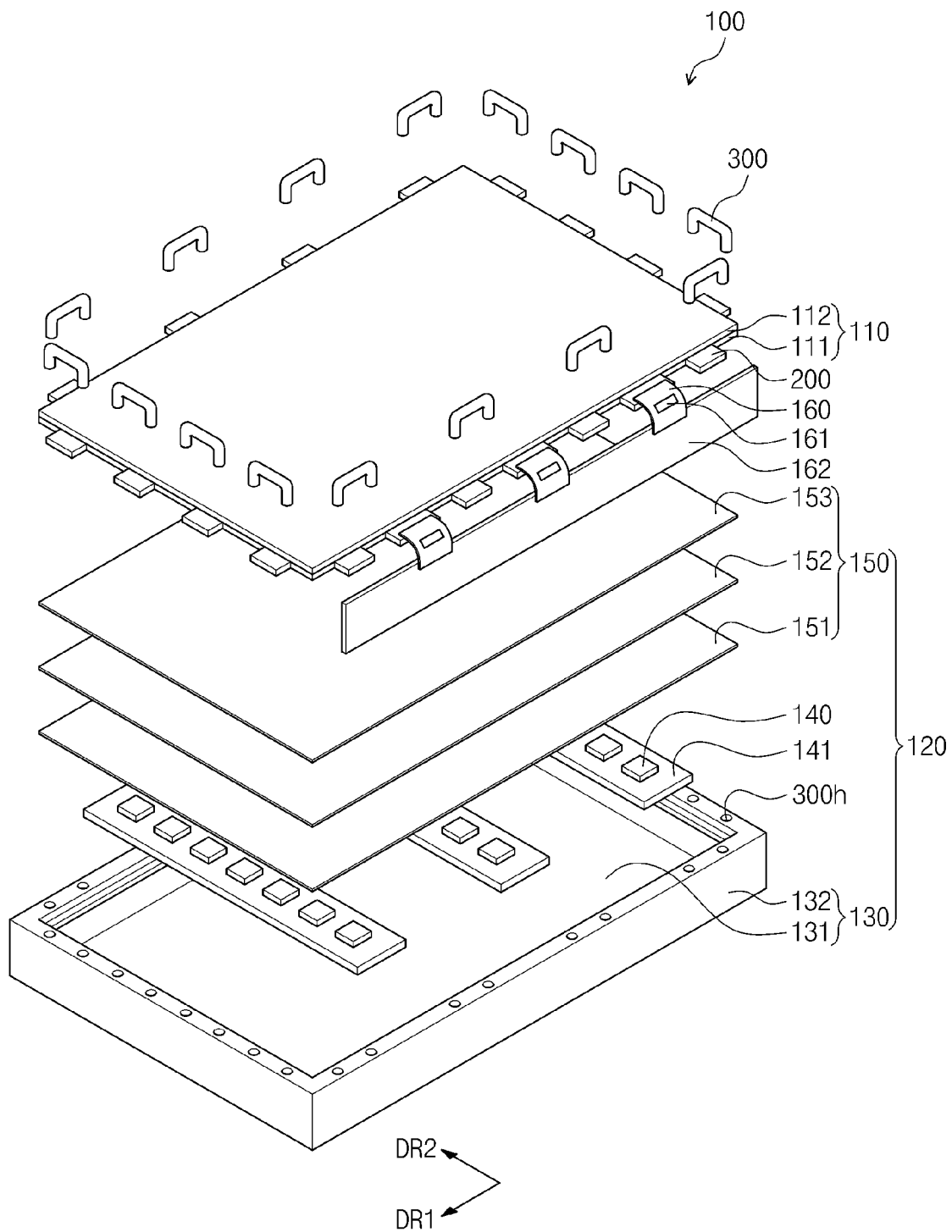
FIG. 1 is an exploded perspective view illustrating an exemplary embodiment of a display apparatus according to the invention.

Hereinafter, embodiments of the invention will be described in detail with reference to the accompanying drawings. The invention will be understood without difficulties through embodiments related to the accompanying drawings. The invention may, however, be embodied in different forms and should not be construed as limited to the embodiments set forth herein. Rather, the embodiments below are provided so that the technical spirit of the invention will be thorough and complete and will be fully conveyed to those skilled in the art. Thus, the scope of the invention should not be construed as limited to the embodiments below. Like reference numerals refer to like elements throughout.

Although the terms "first" and "second" are used herein to describe various elements, these elements should not be limited by these terms. These terms are only used to distinguish one element from another element. In addition, when a layer, a film, a region, or an element is referred to as being "over" or "on" another layer, film, region, or element, it can be directly on the other layer, film, region, or element, or intervening layers, films, regions, or elements may also be present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
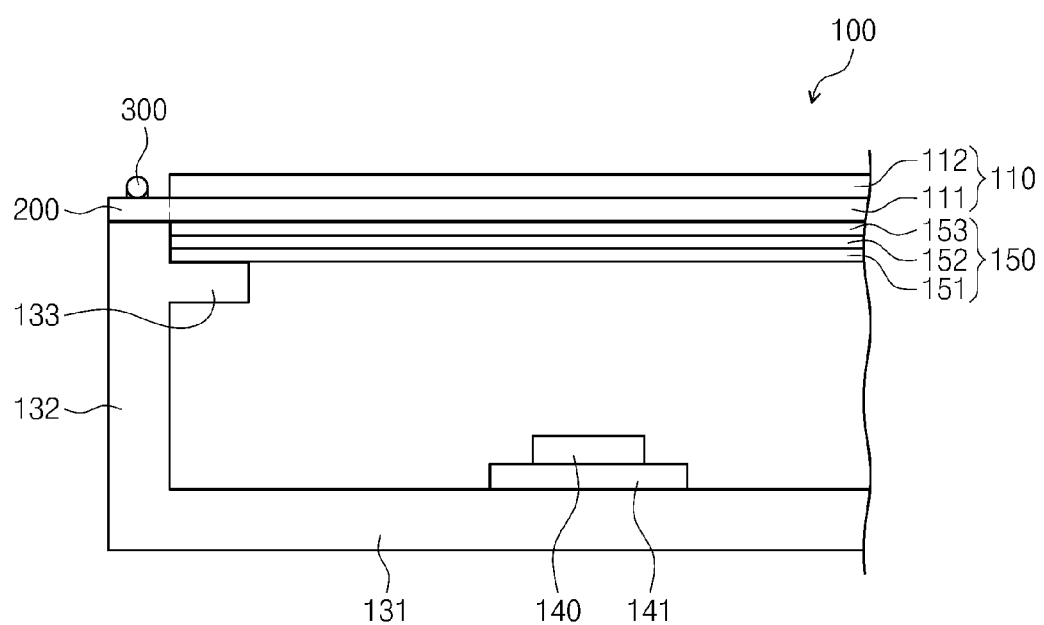
FIG. 2 is a schematic cross-sectional view illustrating the display apparatus of FIG. 1.

FIG. 1 is an exploded perspective view illustrating a display apparatus according to an exemplary embodiment of the invention. FIG. 2 is a schematic cross-sectional view illustrating the display apparatus of FIG. 1.

Referring to FIGS. 1 and 2, a display apparatus 100 may include a display panel 110, a backlight unit 120, and coupling members 300.

The display panel 110 displays an image. In an exemplary embodiment, the display panel 110 may include a liquid crystal display panel, an electro wetting display panel, an electrophoretic display panel, or a micro electro mechanical system ("MEMS") display panel. In the illustrated exemplary embodiment, a liquid crystal display panel ("LCD") is exemplified as the display panel 110.

In an exemplary embodiment, the display panel 110 may have a tetragonal plate shape with two pairs of sides, for example. According to the illustrated exemplary embodiment, the display panel 110 may have a rectangular shape with a pair of long sides and a pair of short sides in a plan view. The display panel 110 includes a lower substrate 111, an upper substrate 112 facing the lower substrate 111, and a liquid crystal layer (not shown) disposed between the lower substrate 111 and the upper substrate 112. The display panel 110 may have a display region DP (refer to FIG. 3) for displaying an image, and a non-display region N_DP (refer to FIG. 3) surrounding the display region DP (refer to FIG. 3) in a plan view. The non-display region N_DP may not display an image.

The lower substrate 111 includes a plurality of pixels in a matrix form. Each of the pixels may include a gate line (not shown) extending in a first direction DR1, a data line (not shown) extending in a second direction DR2 and electrically insulated from the gate line to cross the gate line, and a pixel electrode (not shown). In an exemplary embodiment, the first direction DR1 and second direction DR2 may be substantially perpendicular to each other. Further, each of the pixels may include a thin film transistor ("TFT") (not shown) that is connected to the gate line, the data line, and the pixel electrode.

The upper substrate 112 may include an RGB (red, green, and blue) pixel (not shown) as a color pixel, and a common electrode (not shown) facing the pixel electrode. The lower substrate 111 may include the color pixel and the common electrode. An orientation of the liquid crystal layer is determined according to intensity of an electric field, generated between the pixel electrode and the common electrode, so as to adjust transmissivity of light provided from the backlight unit 120, thereby expressing a desired gradation.

Data driving chips 161 may be disposed on at least one side of the lower substrate 111 in a plan view, to apply a data signal to the data line. A data signal to be applied to the data line of the display panel 110 may be generated in response to an external signal by the data driving chips 161. The external signal is supplied from a printed circuit board ("PCB") 162 and may include an image signal, various control signals, and a driving voltage.

The PCB 162 may be electrically connected to the display panel 110 by a plurality of tape carrier packages ("TCPs") 160. The data driving chips 161 may be mounted on the TCPs 160. The PCB 162 may be disposed on a side wall part 132 of a support member 130.

According to another exemplary embodiment different from the illustrated exemplary embodiment, the TCPs 160 may be bent to surround a side surface of the support member 130. The PCB 162 connected to the TCPs 160 may be disposed at the lower side of the support member 130. In this case, the display apparatus 100 may further include a shield case (not shown) disposed at the lower side of the support member 130 to protect the PCB 162.

The lower substrate 111 may include gate driving chips 163 (refer to FIG. 3) disposed on a side different from the at least one side, to apply a gate signal to the gate line. The gate driving chips 163 (refer to FIG. 3) may be mounted on the lower substrate 111 through a chip on glass ("COG") process. According to another exemplary embodiment different from the illustrated exemplary embodiment, the gate driving chips 163 (refer to FIG. 3) may be provided in the form of a gate driving circuit for applying the gate signal. The gate driving circuit may be disposed on the side different from the at least one side, through a thin film process for forming the display panel 110. Thus, the gate driving circuit may be installed in the display panel 110.

One or more protrusion parts 200 may be disposed on a side surface of the display panel 110. According to the illustrated exemplary embodiment, the protrusion parts 200 are disposed on four sides of the display panel 110. However, according to another exemplary embodiment of the invention, the protrusion parts 200 may be disposed on only one portion of the display panel 110, such as two face-to-face sides of the display panel 110 or a corner part of the display panel 110.

The protrusion parts 200 may be unitary with the display panel 110, and more particularly, protrude from a side surface of the lower substrate 111. The protrusion parts 200 may be provided by grinding the lower substrate 111. The protrusion parts 200 may be disposed on a side surface of the lower substrate 111 on which the TCPs 160 and the gate driving chips 163 (refer to FIG. 3) are not disposed.

The backlight unit 120 provides light to the display panel 110 and is disposed under the display panel 110. The backlight unit 120 may include the support member 130, light sources 140, and optical sheets 150.

According to the illustrated exemplary embodiment, the support member 130 may include a bottom part 131 and the side wall part 132 extending from the bottom part 131. The side wall part 132 may extend upward from the bottom part 131.

The support member 130 may accommodate the light sources 140 and the optical sheets 150 and support the display panel 110. The light sources 140 may be placed on the bottom part 131, and the optical sheets 150 may be disposed on the light sources 140. According to the illustrated exemplary embodiment, the display panel 110 may be coupled to the side wall part 132. A catching protrusion 133 on which the optical sheets 150 are placed may be disposed on an inner surface of the side wall part 132.

The light sources 140 may be disposed on the bottom part 131 and provide light to the display panel 110. The light sources 140 may be mounted on PCBs 141 to receive a driving voltage from the PCBs 141. According to another exemplary embodiment different from the illustrated exemplary embodiment of the invention, the backlight unit 120 may further include a light guide plate (not shown) disposed between the bottom part 131 and the optical sheets 150, and the light sources 140 may be disposed at a side of the light guide plate (not shown) to provide light to the light guide plate.

The optical sheets 150 may be disposed between the light sources 140 and the display panel 110. The optical sheets 150 may control paths of light provided from the light sources 140. The optical sheets 150 may include a diffusion sheet 151, a prism sheet 152, and a protective sheet 153.

The diffusion sheet 151 may diffuse light, and the prism sheet 152 may collect the diffused light such that a propagation direction of the diffused light is close to a direction perpendicular to the display panel 110. The protective sheet 153 may protect the prism sheet 152 from external shock. According to the illustrated exemplary embodiment, the optical sheets 150 include a sheet as each of the diffusion sheet 151, the prism sheet 152, and the protective sheet 153, but the invention is not limited thereto. According to another exemplary embodiment of the invention, at least one of the diffusion sheet 151, the prism sheet 152, and the protective sheet 153 may be provided in plurality as overlapping sheets of the optical sheets 150, and one or more of the diffusion sheet 151, the prism sheet 152, and the protective sheet 153 may be removed when necessary, for example.

According to the illustrated exemplary embodiment, the coupling members 300 may be disposed on the protrusion parts 200 and be bent to the support member 130. When the protrusion parts 200 are disposed on the side wall part 132, the coupling members 300 couple the protrusion parts 200 to the support member 130. In an exemplary embodiment, accommodating recesses 300h may be defined in a surface of the side wall part 132, on which the protrusion parts 200 are disposed, and accommodate the coupling members 300.

According to the illustrated exemplary embodiment, a top chassis (not shown), which covers the non-display region N_DP (refer to FIG. 3) of the display panel 110 and integrates the display panel 110 and the backlight unit 120, may be removed. As a result, the thickness and weight of the display apparatus 100 may be decreased, and process costs may be reduced. Specifically, the display region DP (refer to FIG. 3) may be extended by removing the top chassis (not shown), and a bezel region as the non-display region N_DP (refer to FIG. 3) may be reduced by removing the top chassis (not shown), so that the display apparatus 100 may include a narrow bezel.

The coupling members 300 are disposed on the protrusion parts 200 so as to fix the display panel 110 to the support member 130. A structure such as the coupling members 300 fixes the display panel 110 to the support member 130, thereby preventing coupling force between the support member 130 and the display panel 110 from being decreased by heat or moisture. Accordingly, removal of the display panel 110 from the support member 130 caused by a change of external environment is prevented to couple the display panel 110 and the support member 130 more securely.

Figure 3:
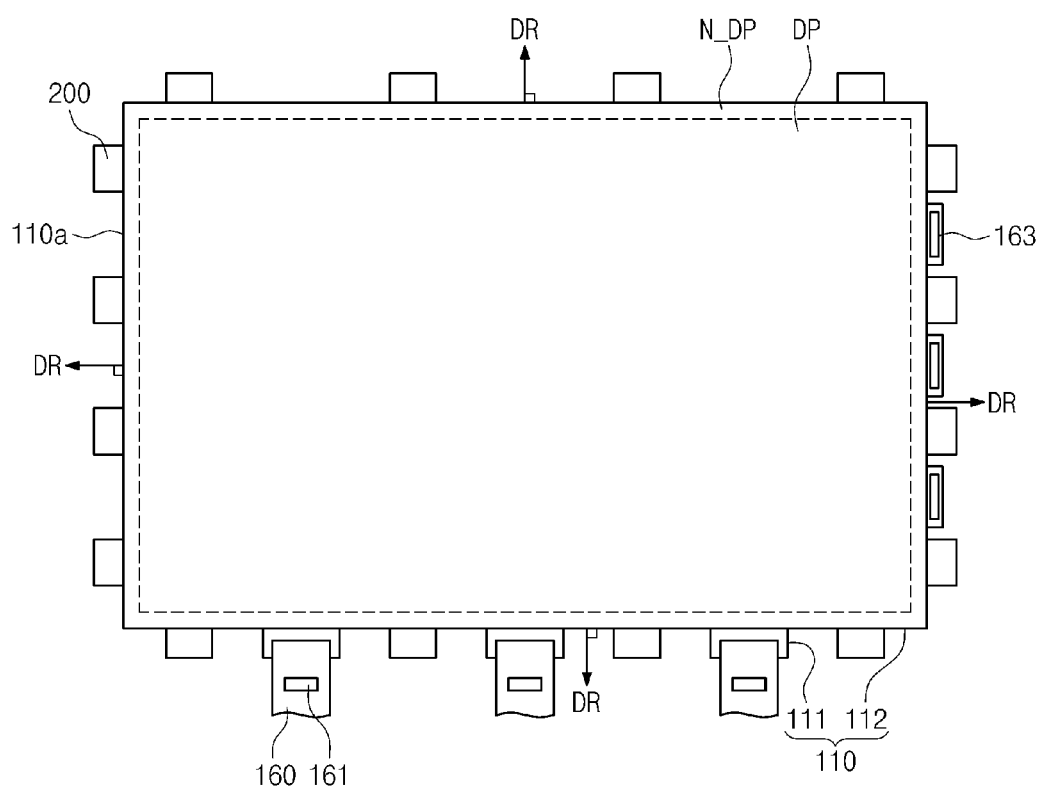
FIG. 3 is a plan view illustrating the display panel of FIG. 1.

FIG. 3 is a plan view illustrating the display panel of FIG. 1. A description of components illustrated in FIG. 3, which are the same as those of FIG. 1, will be omitted.

Referring to FIG. 3, the protrusion parts 200 may protrude in directions DR perpendicular to side surfaces 110a of the display panel 110.

According to the illustrated exemplary embodiment, the protrusion parts 200 may be unitary with the lower substrate 111. The protrusion parts 200 may be provided by grinding the lower substrate 111 that has a size greater than that of the upper substrate 112. In an exemplary embodiment, the protrusion parts 200 may have a tetragonal shape in a plan view, for example.

The protrusion parts 200 disposed at the sides at which the gate driving chips 163 and the TCPs 160 are disposed may be disposed between the gate driving chips 163 and between the TCPs 160. According to the illustrated exemplary embodiment, one or more of the protrusion parts 200 may be provided. The protrusion parts 200 may be disposed on side surfaces of the display panel 110 along the non-display region N_DP and be spaced apart one another.

According to the illustrated exemplary embodiment, since the display panel 110 is coupled to the support member 130 (refer to FIG. 1) by the protrusion parts 200 unitary with the display panel 110, the top chassis may be removed. As a result, the thickness and weight of the display apparatus 100 (refer to FIG. 1) may be decreased, and the process costs may be reduced. Specifically, the display region DP may be extended by removing the top chassis, and the non-display region N_DP may be reduced by removing the top chassis, so that the display apparatus 100 (refer to FIG. 1) may include a narrow bezel.

Figure 4:
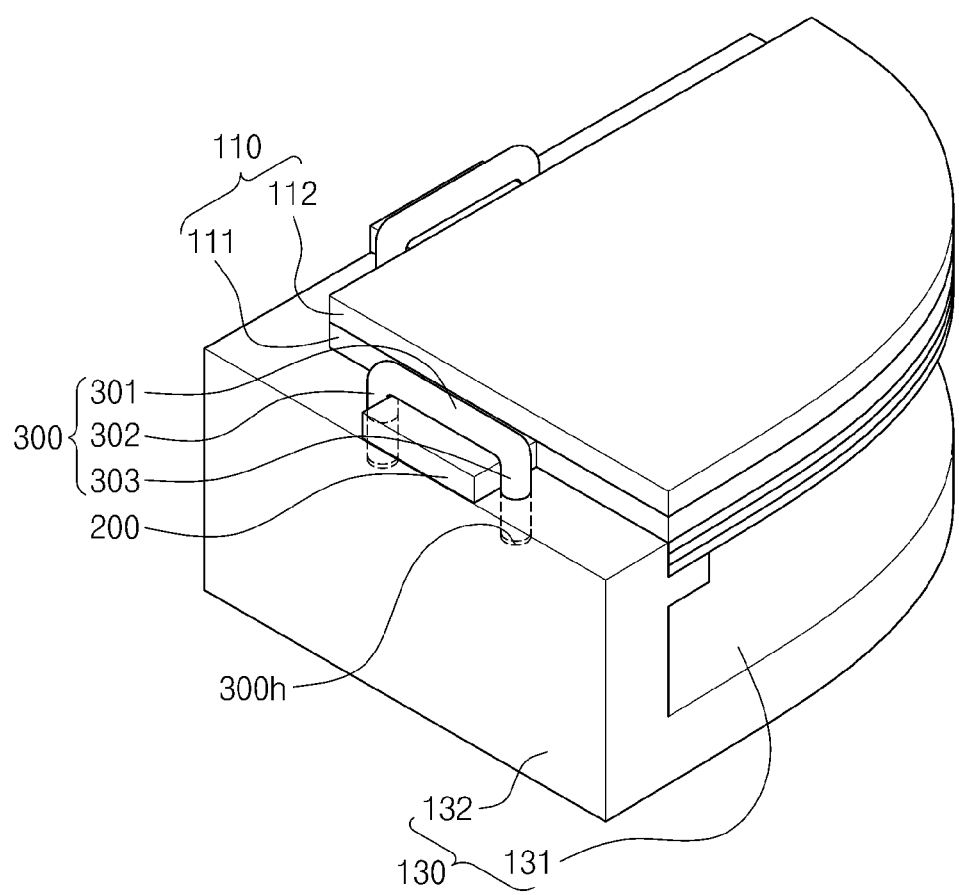
FIG. 4 is an enlarged perspective view illustrating a portion of the display apparatus of FIG. 1.

FIG. 4 is an enlarged perspective view illustrating a portion of the display apparatus of FIG. 1. A description of components illustrated in FIG. 4, which are the same as those of FIG. 1, will be omitted.

Referring to FIG. 4, the coupling member 300 may include a first coupling part 301, a second coupling part 302, and a third coupling part 303.

The first coupling part 301 may be disposed on the protrusion part 200. The first coupling part 301 may press the protrusion part 200 to the support member 130. The second coupling part 302 may extend from an end of the first coupling part 301 and be bent to the support member 130. The third coupling part 303 may extend from the other end of the first coupling part 301 and be bent to the support member 130.

According to the illustrated exemplary embodiment, the coupling member 300 is a wire having a circular cross section, for example. According to another exemplary embodiment, the coupling member 300 may be a wire having a polygonal cross section, for example.

According to another exemplary embodiment different from the illustrated exemplary embodiment, an end of each of the second coupling part 302 and the third coupling part 303, which is coupled to the support member 130, may have a sharp shape, for example. In this case, the sharp shape of the end of each of the second coupling part 302 and the third coupling part 303 may be fixed to the support member 130.

According to another exemplary embodiment different from the illustrated exemplary embodiment, an adhesive material may be disposed in the accommodating recesses 300h and attach the second coupling part 302 and the third coupling part 303 to the inside of the accommodating recesses 300h, thereby coupling the coupling member 300 to the support member 130.

Figure 5:
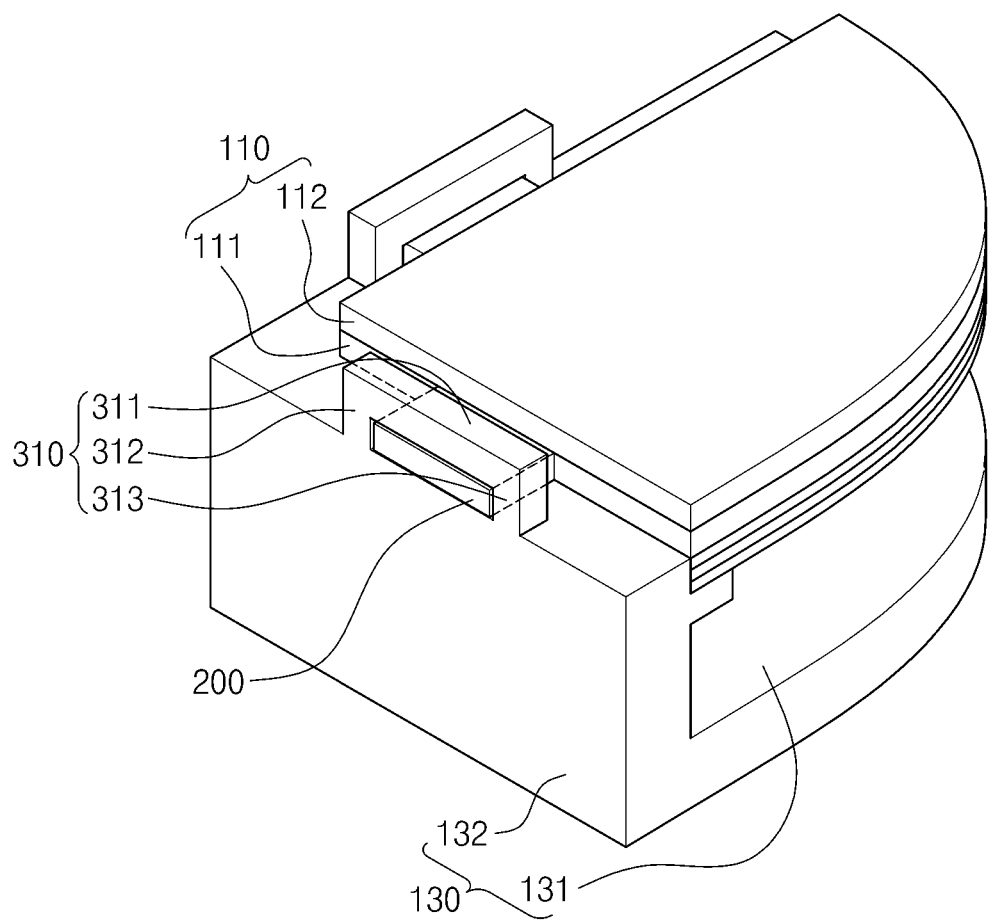
FIG. 5 is an enlarged perspective view illustrating another exemplary embodiment of a portion of a display apparatus according to the invention.

FIG. 5 is an enlarged perspective view illustrating a portion of a display apparatus according to an exemplary embodiment of the invention. A description of components illustrated in FIG. 5, which are the same as those of FIG. 1, will be omitted.

Referring to FIG. 5, a coupling member 310 may include a first coupling part 311, a second coupling part 312, and a third coupling part 313, and a support member 130 may be unitary with the coupling member 310. In an exemplary embodiment, the second coupling part 312 and the third coupling part 313 may extend from the upper surface of a side wall part 132 of the support member 130. The first coupling part 311 may connect the second coupling part 312 to the third coupling part 313.

A protrusion part 200 may be accommodated in a space surrounded by the first coupling part 311, the second coupling part 312, the third coupling part 313, and the side wall part 132. The first coupling part 311 may be disposed on the protrusion parts 200, and the second and third coupling parts 312 and 313 may be disposed on side surfaces of the protrusion part 200.

According to the illustrated exemplary embodiment, the coupling member 310 may be provided while the support member 130 is provided, or the coupling member 310 may be provided and be then fixed to the support member 130.

According to the illustrated exemplary embodiment, since a display panel 110 is coupled to the support member 130 by the coupling member 310 unitary with the support member 130, a top chassis may be removed. As a result, the thickness and weight of a display apparatus 100 may be decreased, and process costs may be reduced. Specifically, the display region DP (refer to FIG. 3) may be extended by removing the top chassis, and the non-display region N_DP (refer to FIG. 3) may be reduced by removing the top chassis, so that the display apparatus 100 may include a narrow bezel.

According to another exemplary embodiment different from the illustrated exemplary embodiment, the coupling member 310 may be connected to the support member 130 by a hinge and be rotatable. In this case, a catching protrusion (not shown) for catching the rotatable coupling member 310 may be disposed on the protrusion part 200.

Figure 6:
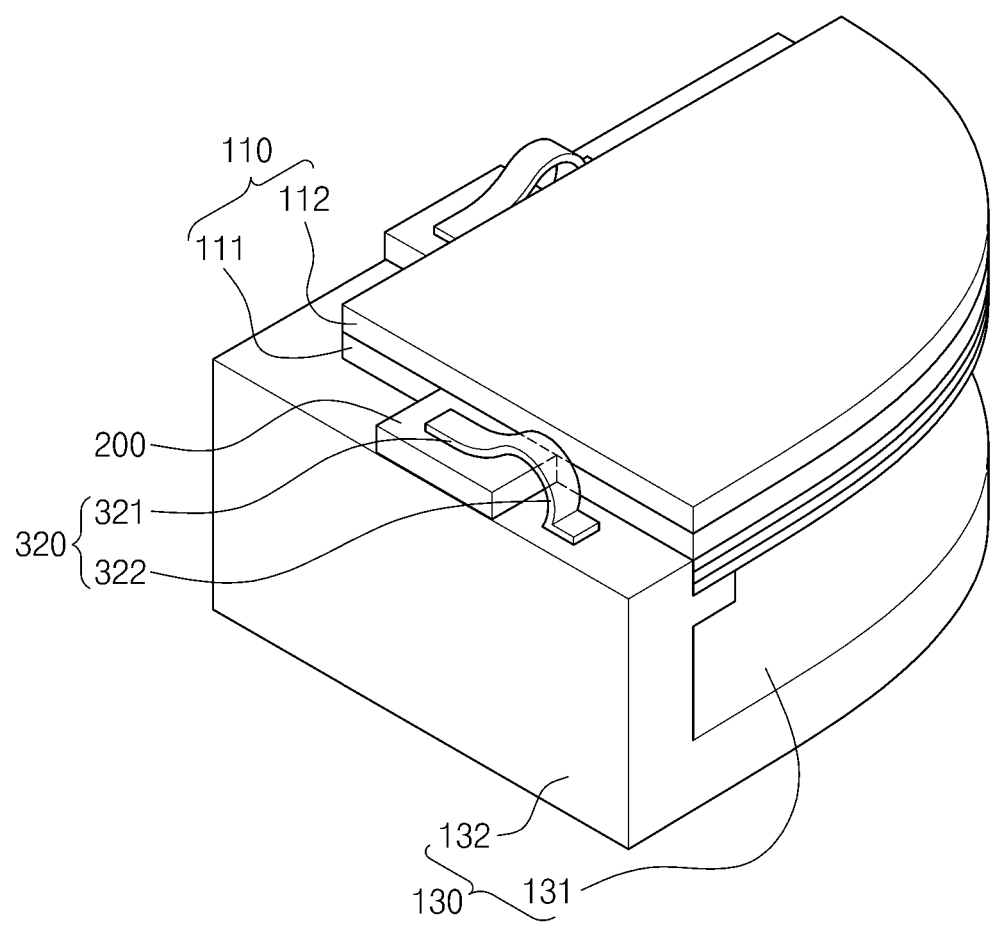
FIG. 6 is an enlarged perspective view illustrating another exemplary embodiment of a portion of a display apparatus according to the invention.

FIG. 6 is an enlarged perspective view illustrating a portion of a display apparatus according to an exemplary embodiment of the invention. A description of components illustrated in FIG. 6, which are the same as those of FIG. 1, will be omitted.

Referring to FIG. 6, a coupling member 320 may include a pressing part 321 and a connecting part 322. The pressing part 321 may be disposed on a protrusion part 200 to press a display panel 110 to a support member 130. The connecting part 322 may extend from the pressing part 321 and be bent to the support member 130 to be coupled to the support member 130.

According to the illustrated exemplary embodiment, the coupling member 320 may have elasticity. The display panel 110 may be more efficiently fixed to the support member 130 by elastic force of the coupling member 320.

Figure 7:
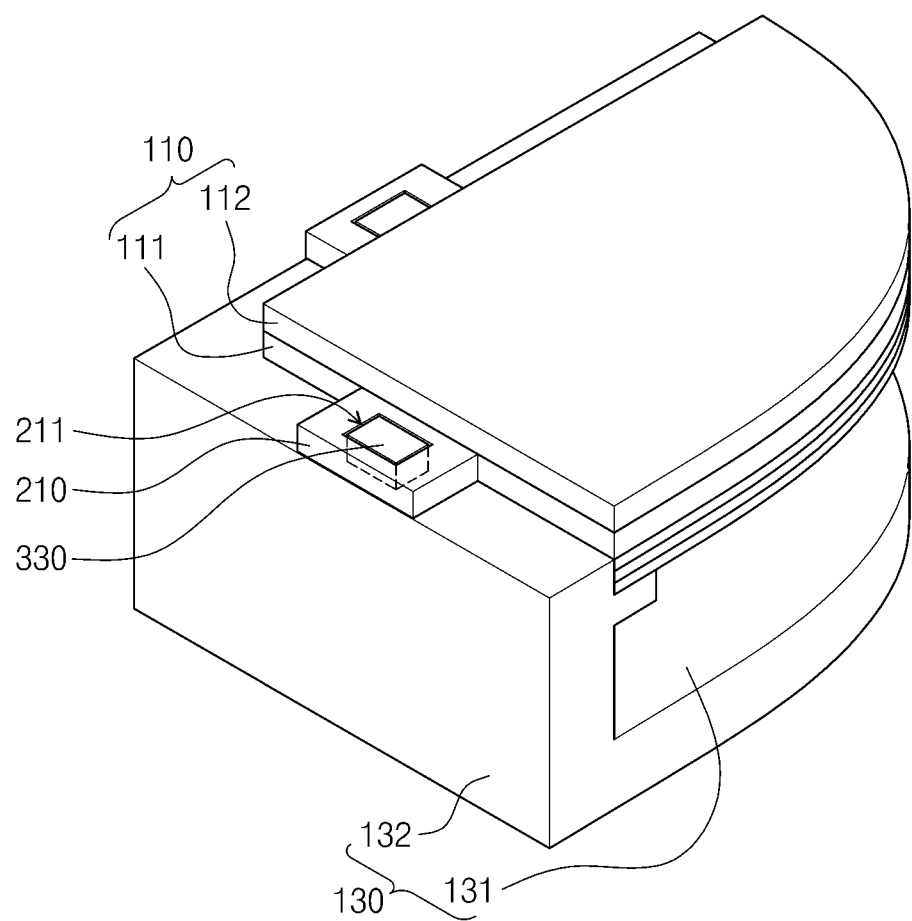
FIG. 7 is an enlarged perspective view illustrating another exemplary embodiment of a portion of a display apparatus according to the invention.

FIG. 7 is an enlarged perspective view illustrating a portion of a display apparatus according to an exemplary embodiment of the invention. A description of components illustrated in FIG. 7, which are the same as those of FIG. 1, will be omitted.

Referring to FIG. 7, a protrusion 330 may be disposed on a support member 130. The protrusion 330 may be disposed on an upper surface of a side wall part 132 of the support member 130. A recess 211 through which the protrusion 330 passes may be defined in a protrusion part 210. The protrusion 330 may pass through the recess 211 and couple a display panel 110 to the support member 130.

According to the illustrated exemplary embodiment, the protrusion 330 has a rectangular shape. According to another exemplary embodiment, a protrusion may be disposed on an upper surface of the protrusion 330, so that the protrusion 330 may be more securely locked to the recess 211.

According to another exemplary embodiment different from the illustrated exemplary embodiment, the protrusion part 210 may be coupled to the side wall part 132 by a coupling member such as a screw. In this case, the recess 211 defined in the protrusion part 210 may have a shape corresponding to that of the screw.

Figure 8:
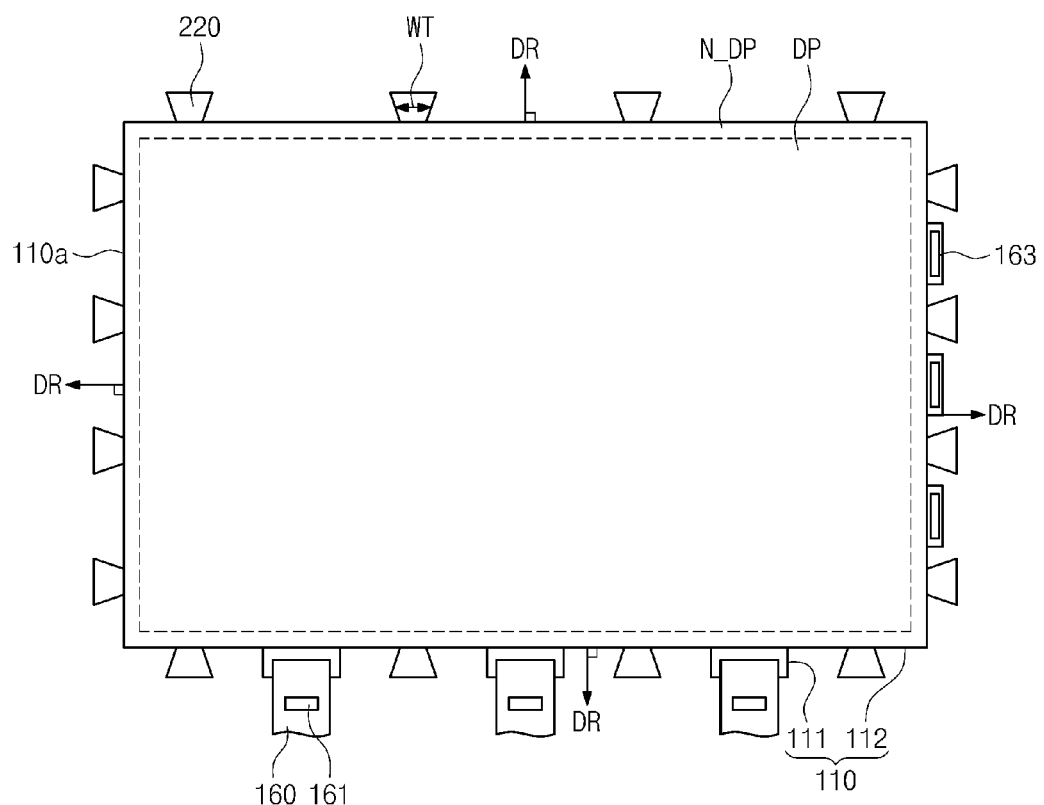
FIG. 8 is a plan view illustrating another exemplary embodiment of a display panel according to the invention.

FIG. 8 is a plan view illustrating a display panel according to an exemplary embodiment of the invention. A description of components illustrated in FIG. 8, which are the same as those of FIG. 3, will be omitted.

Referring to FIG. 8, widths WT of protrusion parts 220 may increase in directions away from side surfaces 110a of a display panel 110.

Coupling members 300 (refer to FIG. 1) may be disposed in regions of the protrusion parts 220 adjacent to the display panel 110, and couple the display panel 110 to a support member 130 (refer to FIG. 1). Since the widths WT of the protrusion parts 220 increase in the directions away from the side surfaces 110a, movements of the display panel 110 are prevented. Thus, the display panel 110 is efficiently fixed to the support member 130 (refer to FIG. 1).

Figure 9:
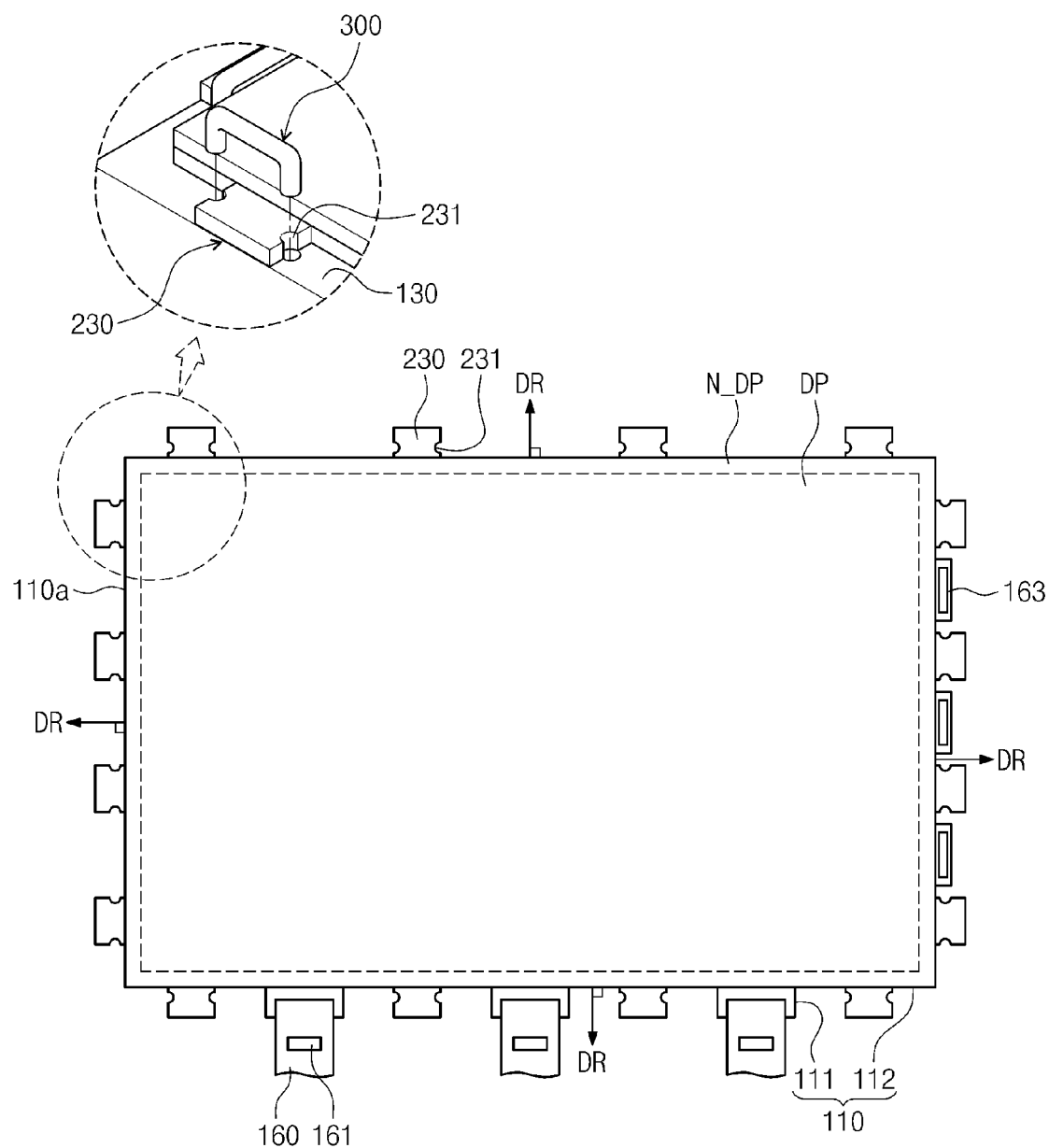
FIG. 9 is a plan view illustrating another exemplary embodiment of a display panel according to the invention.

FIG. 9 is a plan view illustrating a display panel according to an exemplary embodiment of the invention. A description of components illustrated in FIG. 9, which are the same as those of FIG. 3, will be omitted.

Referring to FIG. 9, recesses 231 may be defined in protrusion parts 230. The recesses 231 may be defined in surfaces adjacent to side surfaces 110a of a display panel 110. Coupling members 300 may be accommodated in the recesses 231.

The recesses 231 may be defined in side surfaces of the protrusion parts 230. The coupling members 300 may be accommodated in the recesses 231, and couple the display panel 110 to a support member 130. Since the coupling members 300 are accommodated in the recesses 231, movements of the display panel 110 coupled to the support member 130 are prevented. Thus, the display panel 110 is efficiently fixed to the support member 130.

Figure 10:
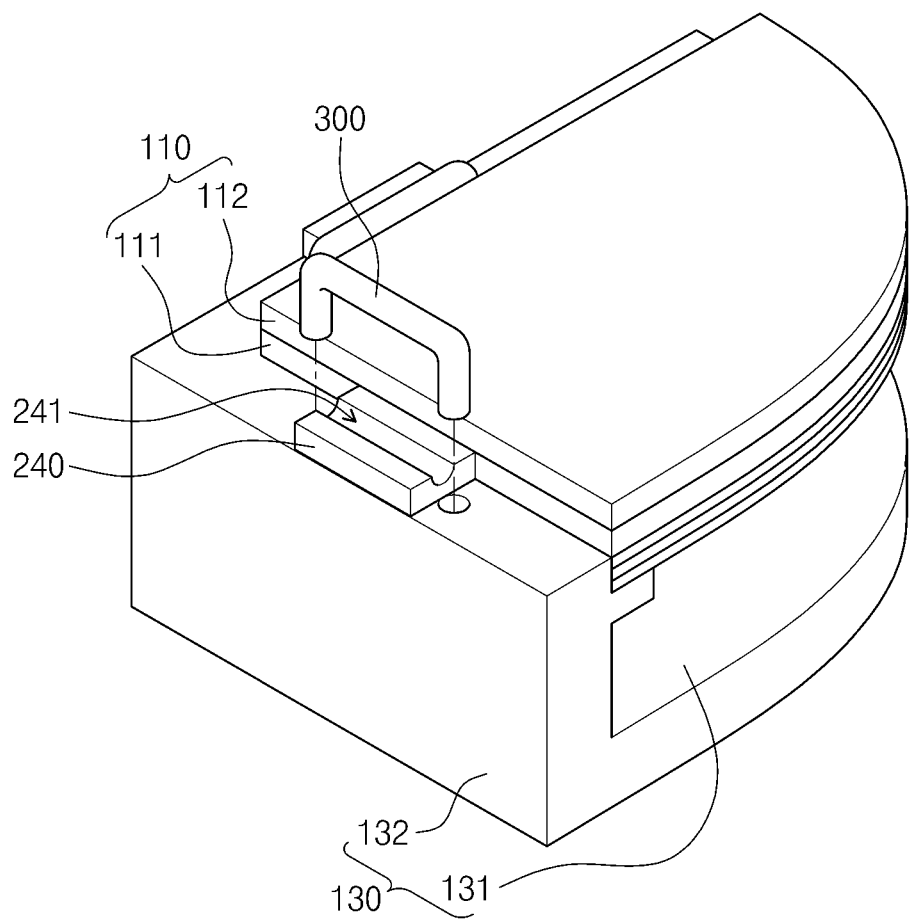
FIG. 10 is an enlarged perspective view illustrating another exemplary embodiment of a portion of a display panel according to the invention.

FIG. 10 is an enlarged perspective view illustrating a portion of a display panel according to an exemplary embodiment of the invention.

A description of components illustrated in FIG. 10, which are the same as those of FIG. 9, will be omitted.

Referring to FIG. 10, a recess 241 may be defined in the upper surface of a protrusion part 240. A coupling member 300 may be accommodated in the recess 241.

The coupling member 300 may couple a display panel 110 to a support member 130. Since the coupling member 300 is accommodated in the recess 241, a movement of the display panel 110 coupled to the support member 130 is prevented. Thus, the display panel 110 is efficiently fixed to the support member 130.

According to another exemplary embodiment different from the illustrated exemplary embodiment, the recess 241 may be defined in an edge of the protrusion part 240 where the upper surface of the protrusion part 240 meets a side surface of the protrusion part 240. In this case, the shape of the coupling member 300 may be modified to be accommodated in the recess 241 defined in the edge. In an exemplary embodiment, an edge of the coupling member 300 may have an inclined shape.

Figure 11:
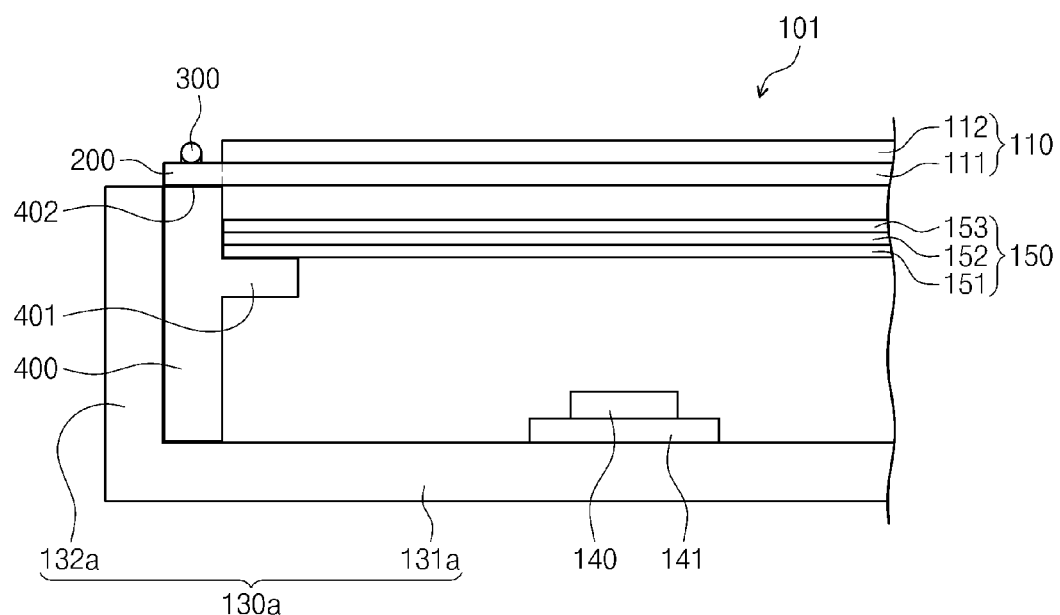
FIG. 11 is a schematic cross-sectional view illustrating another exemplary embodiment of a display apparatus according to the invention.

FIG. 11 is a schematic cross-sectional view illustrating a display apparatus according to an exemplary embodiment of the invention.

A description of components illustrated in FIG. 11, which are the same as those of FIG. 2, will be omitted.

Referring to FIG. 11, a display apparatus 101 may include an accommodating member 130a, which accommodates a light source 140, optical sheets 150, and a support member 400.

The accommodating member 130a may include a bottom part 131a and a side wall part 132a, and the light source 140 and a PCB 141 may be mounted on the bottom part 131a. In an exemplary embodiment, the bottom part 131a may be coated with a reflective material, for example. According to another exemplary embodiment different from the illustrated exemplary embodiment, a reflective sheet (not shown) may be disposed between the PCB 141 and the bottom part 131a to reflect light.

The support member 400 may be accommodated in the accommodating member 130a and support a display panel 110 and the optical sheets 150. A catching protrusion 401 may be disposed on an inner surface of the support member 400. The display panel 110 may be supported by an upper surface 402 of the support member 400 and be fixed to the upper surface 402, and the optical sheets 150 may be disposed on the catching protrusion 401.

In an exemplary embodiment, the accommodating member 130a may be coupled to the support member 400 by a coupling member such as a screw (not shown) passing through the side wall part 132a of the accommodating member 130a.

Figure 12:
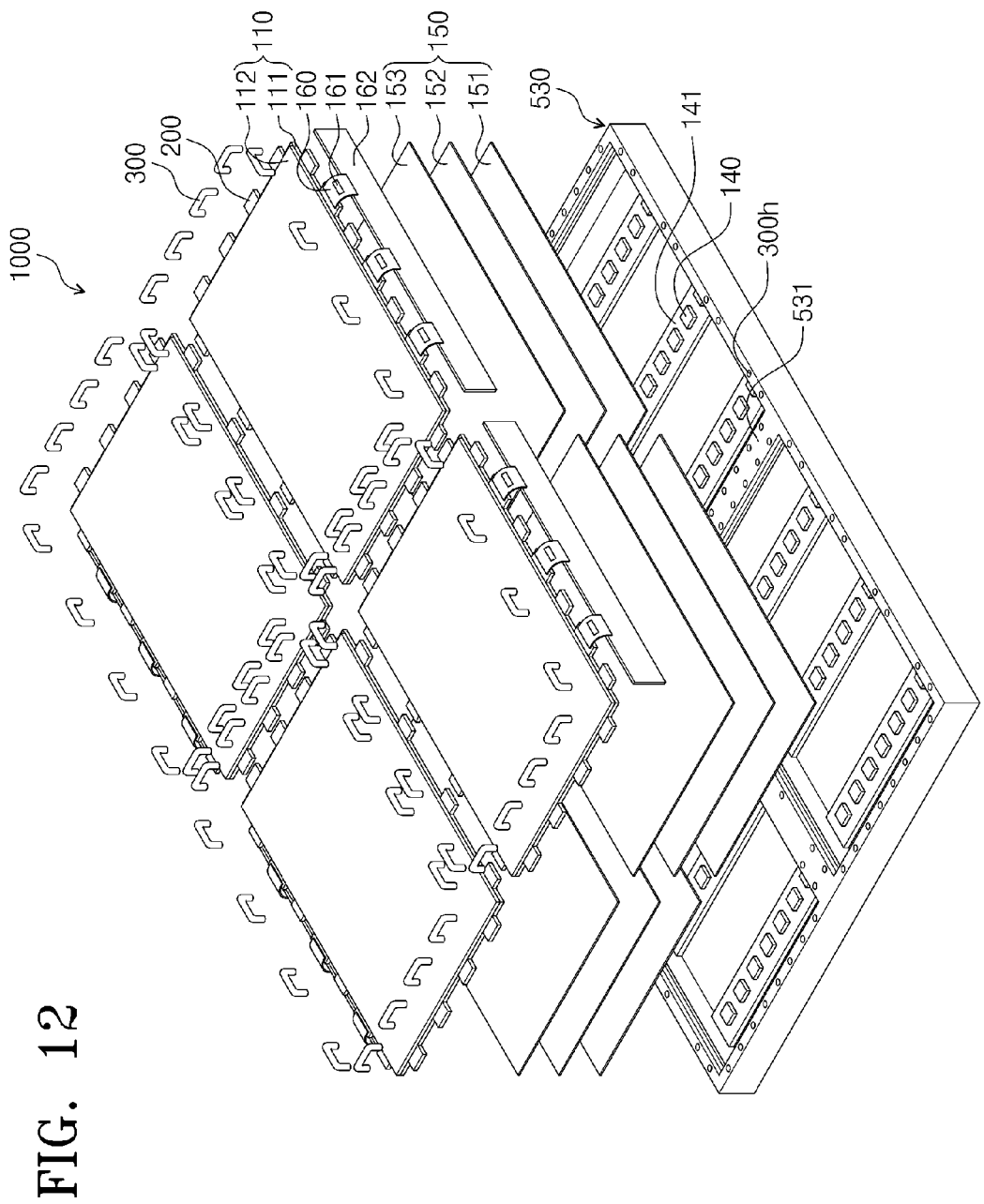
FIG. 12 is an exploded perspective view illustrating another exemplary embodiment of a display apparatus according to the invention.

FIG. 12 is an exploded perspective view illustrating a display apparatus according to an exemplary embodiment of the invention.

A description of components illustrated in FIG. 12, which are the same as those of FIG. 1, will be omitted.

Referring to FIG. 12, a tile type display apparatus 1000 may include a plurality of display panels 110. The display panels 110 may be arrayed in the form of tiles.

The display panels 110 may be supported by a support member 530. In this case, a partition wall 531 may be disposed in the support member 530 to support the display panels 110.

According to another exemplary embodiment different from the illustrated exemplary embodiment, the number of support members 530 may correspond to the number of the display panels 110. In an exemplary embodiment, when the tile type display apparatus 1000 has four display panels 110, a plurality of support members may be disposed under the four display panels 110 and be in one-to-one correspondence to the four display panels 110.

According to the illustrated exemplary embodiment, coupling members 300 may be disposed on protrusion parts 200 to fix the display panels 110 to the support member 530. A structure such as the coupling members 300 fixes the display panels 110 to the support member 530, thereby preventing coupling force between the support member 530 and the display panels 110 from being decreased by heat or moisture. Accordingly, removal of the display panels 110 from the support member 530 caused by a change of external environment is prevented to couple the display panels 110 and the support member 530 more securely.

In addition, a top chassis (not shown), which covers non-display regions N_DP (refer to FIG. 3) of the display panels 110 and integrates the display panels 110 and a backlight unit 120, may be removed. As a result, the thickness and weight of the tile type display apparatus 1000 may be decreased, and process costs may be reduced. Specifically, display regions DP (refer to FIG. 3) may be extended by removing the top chassis (not shown), and bezel regions as the non-display regions N_DP (refer to FIG. 3) may be reduced by removing the top chassis (not shown), so that the tile type display apparatus 1000 may include a narrow bezel. Thus, seam spaces between the display panels 110 disposed in the form of tiles are minimized.

According to the invention, since a display panel is coupled to a support member by a coupling member, a top chassis for coupling the display panel to a backlight unit may be removed. As a result, the thickness and weight of a display apparatus may be decreased, and process costs may be reduced. Specifically, a display region may be extended by removing the top chassis, and a bezel region as a non-display region may be reduced by removing the top chassis, so that the display apparatus may include a narrow bezel.

In addition, the coupling member is disposed on a protrusion part to fix the display panel to the support member. A structure such as the coupling member fixes the display panel to the support member, thereby preventing coupling force between the support member and the display panel from being decreased by heat or moisture. Accordingly, removal of the display panel from the support member caused by a change of external environment is prevented to couple the display panel and the support member more securely.

The above-disclosed subject matter is to be considered illustrative and not restrictive, and the appended claims are intended to cover all such modifications, enhancements, and other exemplary embodiments, which fall within the true spirit and scope of the invention. Thus, to the maximum extent allowed by law, the scope of the invention is to be determined by the broadest permissible interpretation of the following claims and their equivalents, and shall not be restricted or limited by the foregoing detailed description.

What is claimed is:

1. A display apparatus comprising:
a display panel which receives light to display an image;
a backlight unit, which includes a light source providing the light to the display panel, and a support member supporting the display panel;
at least one protrusion part disposed on a side surface of the display panel and protruding from the side surface of the display panel wherein a recess is defined in an upper surface of the at least one protrusion part adjacent to the side surface of the display panel; and
a coupling member disposed in the recess to couple the display panel to the support member,
wherein the coupling member includes a first coupling part disposed on the recess;
a second coupling part extending from an end of the first coupling part and bent to the support member to be coupled to the support member; and
a third coupling part extending from the other end of the first coupling part and bent to the support member to be coupled to the support member.

2. The display apparatus of claim 1, wherein the at least one protrusion part protrudes in a direction perpendicular to the side surface of the display panel.

3. The display apparatus of claim 1, wherein the display panel includes an upper substrate and a lower substrate, and the at least one protrusion part protrudes from the lower substrate and is unitary with the lower substrate.

4. The display apparatus of claim 1, wherein the at least one protrusion part has a tetragonal shape in a plan view.

5. The display apparatus of claim 1, wherein the support member includes a bottom part on which the light source is placed, and a side wall part which supports the display panel, and the coupling member is coupled to the side wall part.

6. The display apparatus of claim 1, wherein the backlight unit further includes:
at least one optical sheet which guides the light to the display panel; and
an accommodating member which accommodates the light source, the at least one optical sheet, and the support member, and
the support member supports the display panel and the at least one optical sheet.

7. The display apparatus of claim 1, wherein accommodating recesses are defined in the support member to accommodate the second coupling part and the third coupling part.

8. A display apparatus comprising:
a plurality of display panels displaying an image and arrayed in a form of tiles;
at least one support member supporting the plurality of display panels;
at least one protrusion part disposed on a side surface of each of the plurality of display panels and protruding from the side surface of each of the plurality of display panels wherein a recess is defined in an upper surface of the at least one protrusion part adjacent to the side surface of each of the plurality of display panels; and
a coupling member disposed in the recess to couple each of the plurality of display panels to the at least one support member,
wherein the coupling member includes a first coupling part disposed on the recess;
a second coupling part extending from an end of the first coupling part and bent to the support member to be coupled to the support member; and
a third coupling part extending from the other end of the first coupling part and bent to the support member to be coupled to the support member.

9. The display apparatus of claim 8, wherein each of the plurality of display panels includes an upper substrate and a lower substrate, and the at least one protrusion part protrudes from the lower substrate and is unitary with the lower substrate.

* * * * *